(12) United States Patent
Gwan

(10) Patent No.: US 8,153,550 B2
(45) Date of Patent: Apr. 10, 2012

(54) PROCESS OF MANUFACTURING OIL ADSORPTION FOAMING SHEET USING PEAT MOSS

(76) Inventor: Gi-Man Gwan, Busan (KR)

( * ) Notice: Subject to any disclaimer, the term of this patent is extended or adjusted under 35 U.S.C. 154(b) by 374 days.

(21) Appl. No.: 12/593,658

(22) PCT Filed: Apr. 10, 2008

(86) PCT No.: PCT/KR2008/002002
§ 371 (c)(1),
(2), (4) Date: Sep. 29, 2009

(87) PCT Pub. No.: WO2008/127010
PCT Pub. Date: Oct. 23, 2008

(65) Prior Publication Data
US 2010/0152039 A1    Jun. 17, 2010

(30) Foreign Application Priority Data
Apr. 11, 2007    (KR) .................... 10-2007-0035659

(51) Int. Cl.
*B01J 20/22* (2006.01)
*B01J 20/26* (2006.01)

(52) U.S. Cl. ........................ 502/402; 502/401

(58) Field of Classification Search ................ None
See application file for complete search history.

(56) References Cited

U.S. PATENT DOCUMENTS

| 5,181,802 A | 1/1993 | Thengs et al. |
| 6,541,569 B1 | 4/2003 | Morris et al. |

FOREIGN PATENT DOCUMENTS

| KR | 1019970061320 A | 9/1997 |
| KR | 1020030024230 A | 3/2003 |
| KR | 1020060068163 A | 6/2006 |

OTHER PUBLICATIONS

International Search Report: PCT/KR2008/002002, Aug. 20, 2008.

*Primary Examiner* — Emily Le
*Assistant Examiner* — Sarah A Slifka
(74) *Attorney, Agent, or Firm* — Ladas & Parry LLP

(57) ABSTRACT

Provided is a process of manufacturing an oil adsorption foaming sheet for preventing or recovering pollution of ocean or soil by oil or hydrocarbon. The oil adsorption foaming sheet is manufactured by mixing polyurethane prepolymer with refined peat moss, lecithin as a dispersion and surfactant agent, N-methylmorpline as a foaming agent, and triethylenamin as a catalyst, to thereby form a foaming composite, foaming the foaming composite, to thereby obtain a soft continuous air bubble foaming body, slicing the foaming body, and drying the sliced foaming body into a moisture content of 2 wt % or below.

1 Claim, No Drawings

PROCESS OF MANUFACTURING OIL ADSORPTION FOAMING SHEET USING PEAT MOSS

TECHNICAL FIELD

The present invention relates to a process of manufacturing an oil adsorption foaming sheet for preventing pollution of the ocean or soil by oil or hydrocarbon, or recovering the ocean or soil polluted by oil or hydrocarbon, and more particularly to a process of manufacturing an oil adsorption foaming sheet using peat moss for preventing pollution of the ocean or soil by oil or hydrocarbon, or recovering the ocean or soil polluted by oil or hydrocarbon, in which a foaming composite consisting of soft polyurethane prepolymer mixed with peat moss from which stone, gravel, wooden pieces, and grass are removed and refined into a moisture-containing state and lecithin, is foamed to thereby obtain a block-shaped polyurethane foaming body, the block-shaped polyurethane foaming body is sliced into sheets, and the sliced sheets is dried into a moisture content of 2 wt % or below.

BACKGROUND ART

As crude oil demand increases rapidly by fast progress of industry at recent years, oil exploration is lively performed, and crude oil transportation increases rapidly. Accordingly, an accident at sea by an oil outward flow would frequently occur. As a result, fishes may fall dead and birds are fatally damaged. In addition, habitat of birds may decrease. Further, the soil and ocean may be polluted by exploration and drilling. The soil and ocean are gradually severely polluted by a malicious outward flow of industrial waste as well as an accident of leakage and rupture of oil pipage or storage tanks.

A number of oil adsorbents and oil adsorption methods have been developed for such problem solution. There are hundreds of oil adsorbents which are currently used. The oil adsorbents are classified into ones for preventing oil pollution of the ocean or recovering the soil polluted by oil, according to use. According, to ingredients of oil adsorbents, the oil adsorbents are classified into an inorganic adsorbent of porous mine such as zeolite, illite, and perlite, and clayey bentonite having a large swelling property, a natural oil adsorbent of a vegetable property having a good porous adsorption capability such as shell of pine trees, the contents of African millet and corn, waste pulp, trunk of sedge, sawdust, and the chaff, and an adsorbent of a polymeric material such as particles, fibers, and non-woven cloths, which are made of polyethylene, polyprophylene, or polystyrene, a surface active agent and a surface active agent composite, and the above-described oil adsorbents, alone or in combination thereof. Besides, there is an oil adsorbent for recovering the soil in which an oil decomposition microbial medicine prepared from microbes is combined with the oil adsorbent, to thus enable biodegradation of the soil biologically.

In particular, the oil adsorbents for preventing ocean pollution among the above-described adsorbents are formed by adsorbing or infiltrate a surface active agent or surface active agent composite into an inorganic adsorbent or vegetable property adsorbent mainly, to then be spread in an oil pollution area of the sea to adsorb the contaminated oil. However, the particles of the oil adsorbent are sunk on the underwater ground floor at the state where the oil adsorbent adsorbs and emulsifies oil, to thus cause a secondary pollution on the ground floor. As being the case, part of the adsorbed oil is leached by water pressure and floated on the sea. In addition, a hydrocarbon adsorbent made of a composition polymer such as polyethylene and polypropylene has a good adsorptive power, but it takes long to adsorb the polluted oil. The hydrocarbon that is adsorbed by an outer surface tension is not adsorbed perfectly, but part of oil bubbles is leached.

In addition, a method of purifying underground water that has been polluted by organic matters by use of organic clay is introduced in the Korean patent publication No. 10-2006-0068163. In the Korean patent publication No. 10-2006-0068163, an adsorbent which adsorbs organic pollution materials which are made by adsorbing a surface active agent to a clay mineral, is put into the polluted underground water, to thus adsorb the organic pollution materials. Then, the organic pollution materials are separated from the underground water. Accordingly, the underground water that has been polluted by organic matters is purified by use of organic clay.

In the case of the above-described method of purifying underground water that has been polluted by organic matters by use of organic clay, it is extremely difficult to separate and remove the oil adsorbent of the powder or particle state into which oil has been adsorbed from the underground water. In addition, it is possible to perform an oil adsorption work in a small-scale limited area, but it is not possible to perform an oil adsorption work for a bulky ocean pollution.

Besides, a method of manufacturing an oil adsorbent using peat moss whose oil adsorption is superexcellent and an oil adsorption method using the oil adsorbent, are introduced recently.

As as example, a biological biodegradation adsorbent for removing oil and the other hydrocarbon compound and a method of manufacturing the same is introduced in the Korean patent registration No. 10-0455754. In the Korean patent registration No. 10-0455754, the biological biodegradation adsorbent and the method of manufacturing the same are used for soil recovery of the soil which has been polluted by oil or hydrocarbon, in which a surface active agent is added to peat moss, and the surface active agent added peat moss is dried to have a moisture content of 7-8 wt %, and then a microbial medicine prepared from microbes is inoculated into and fixed to a matrix (medium: elvan powder). That is, the matrix is added to the biological biodegradation adsorbent.

The biological biodegradation adsorbent is used for recovery of the soil which has been polluted by hydrocarbon including oil, but it is difficult to use it in the vast sea. Although the biological biodegradation adsorbent may used for preventing ocean pollution, the biological biodegradation by microbes is ineffective or meaningless. In addition, the particles which is formed by adding a surface active agent to peat moss or elvan powder has an oil adsorption function. However, the above-described particles or elvan powder may sink on the bottom of the sea after oil adsorption, which may cause a secondary pollution on the ground floor.

Besides, a method of manufacturing an adsorption filter which uses peat moss as a main material is introduced in the Korean patent publication No. 1997-0061320. In the adsorption filter manufacturing method, peat moss is put into a kiln and maintained at 300° C., to thus reduce a moisture content to be simultaneously carbonated into about 50% or so. Accordingly, the property of the peat moss is formed into a porous capillary tube fibroid material. In addition, a biological recovery method of recovering soil polluted by oil by use of peat moss is introduced in the Korean utility-model registration No. 20-0348451. In the Korean utility-model registration No. 20-0348451, a fertility index and an acidity of soil are measured, and then a nutrient, alkali (quicklime or calcium carbonate), and a peat moss adsorbent are added to the soil according to the measured result, to thus recover the soil polluted by oil into the soil from which oil is removed. Accordingly, the biological recovery method is not proper as a method of adsorbing and removing oil polluted on the sea.

DISCLOSURE OF THE INVENTION

To solve the above problems, it is an object of the present invention to provide a process of manufacturing an oil adsorption foaming sheet using peat moss, in order to solve the above-described conventional problems of an oil or hydrocarbon adsorbent, in which peat moss which is a natural material whose adsorption function is excellent is dispersed in and fixed to a soft polyurethane foaming sheet which is a polymeric material, to accordingly maximize an adsorption function of oil or hydrocarbon.

It is another object of the present invention to provide a process of manufacturing an oil adsorption foaming sheet using peat moss, which may perform prevention of ocean pollution or recovery of soil in the form of a sheet, to thereby prevent secondary pollution which may be caused by scattering or ocean floor deposition of polluted materials, unlike the conventional oil adsorbent which is formed by fixing a surface active agent to a porous natural mineral or a porous vegetable fiber.

It is still another object of the present invention to provide a process of manufacturing an oil adsorption foaming sheet using peat moss, in which peat moss which is a natural material whose adsorption function is excellent is dispersed in and fixed to a soft polyurethane foaming sheet which is a polymeric material, and in which the soft polyurethane foaming sheet to which the peat moss has been fixed and then oil is adsorbed, is dipped into a lecithin or surface active agent solution and then dried, to accordingly re-use the soft polyurethane foaming sheet as the oil adsorption foaming sheet two or three times, and to thus provide a more economical efficiency and enhance a more competitiveness.

To accomplish the above objects of the present invention, according to an aspect of the present invention, there is provided a process of manufacturing an oil adsorption foaming sheet, using peat moss, the oil adsorption foaming sheet manufacturing process comprising:

mixing polyurethane prepolymer of 15-17 wt % with peat moss cement of 80-82.8 wt % which is obtained by removing foreign matters from peat moss having a moisture content of 10-50 wt % and making the peat moss pass through a 100-mesh screen, lecithin of 1-2 wt % as a dispersion and surfactant agent, N-methylmorpline of 1-1.5 wt % as a foaming agent, and triethylenamin of 0.2-0.3 wt % as a catalyst, to thereby form a foaming composite;

foaming the foaming composite to thereby obtain a block-shaped polyurethane foaming body;

slicing the block-shaped polyurethane foaming body to then be made into sheets of a desired thickness; and drying the sliced sheets into a moisture content of 2 wt % or below.

BEST MODE FOR CARRYING OUT THE INVENTION

The above and/or other objects and/or advantages of the present invention will become more apparent by the following description. Hereinbelow, a process of manufacturing an oil adsorption foaming sheet, using peat moss, according to an embodiment of the present invention, will be described in more detail.

In more detail, the process of manufacturing an oil adsorption foaming sheet, using peat moss, includes: a first step of manufacturing polyurethane prepolymer; a second step of obtaining peat moss cement; a third step of forming a foaming composite; a fourth step of foaming the polyurethane prepolymer into a block-shaped polyurethane foaming body; a fifth step of slicing the block-shaped polyurethane foaming body into a predetermined thickness of sheets; and a sixth step of drying the sliced sheets into a moisture content of 2 wt % or below.

In the first step of manufacturing polyurethane prepolymer, water of 0.2 pbw or so is applied to polypropyleneglycol (PPG) of 100 pbw or so and then is heated at 35 to 40° C. for 20 to 30 minutes. Then, toluene 2,4-diisocyanate (TDI) is applied to the heated polypropyleneglycol (PPG) to start an exothermic reaction, so that a mole fraction of NCO/OH becomes approximately 1.1 and a mole fraction of $NCO/H_2O$ becomes approximately 1.05. If the exothermic reaction is ended, the polypropyleneglycol (PPG) is gradually heated to heighten the temperature up to about 120° C. Then, the polypropyleneglycol (PPG) is stirred and reacted for about 2 hours at a state where the temperature is maintained at about 120° C. Then, the reaction solution is cooled at about 80° C., and then TDI of 25 pbw or so is applied to and mixed well with the reaction solution, so that a content ratio of NCO with respect to the reaction solution becomes about 9.5 wt %. Then, the reaction solution mixed with the TDI is heated up to heighten the temperature up to about 120° C., and then is maintained at about 120° C. Then, the reaction solution is reacted and cooled for 40 to 80 minutes at a state where the temperature is maintained at about 120° C., to thus obtain polyurethane prepolymer.

In the second step of obtaining peat moss cement, foreign matters are removed from peat moss having a moisture content of 10-50 wt % and simultaneously the peat moss free from the foreign matters is grinded into small particles, to then make the peat moss pass through a 100-mesh screen, and to thus obtain the peat moss cement.

In the third step of forming a foaming composite, polyurethane prepolymer of 15-17 wt % of the first step is mixed with peat moss cement of 80-82.8 wt % of the second step, lecithin of 1-2 wt % as a dispersion and surfactant agent, N-methylmorpline of 1-1.5 wt % as a foaming agent, and triethylenamin of 0.2-0.3 wt % as a catalyst, to thereby form a foaming composite consisting.

In the fourth step, the foaming composite is foamed, to thereby obtain a block-shaped polyurethane foaming body.

In the fifth step, the block-shaped polyurethane foaming body is sliced to then be made into sheets of a desired thickness.

In the sixth step, the sliced sheets are dried into a moisture content of 2 wt % or below, to finally obtain an oil adsorption foaming sheet.

Peat moss which is used in a process of manufacturing an oil adsorption foaming sheet is formed by decomposition and deformation of trees and shrubs such as moss, Poaceae, and Cyperales, which are accumulated deeply in the basin, swale, or marshland and biologically changed over long-range time. That is, peat moss is not formed by carbonization of trees and shrubs such as moss, Poaceae, and Cyperales, which are accumulated deeply in the basin, swale, or marshland, by the ground pressure or heat, but is formed by corrosion, decomposition, or transmutation of rosin, lignin, fiber etc., that is a main ingredient of a vegetable matter by a biological reaction. The peat moss is called moor coal or peat having a content of 45 to 60% although there will be a difference according to periods. The peat moss is chiefly mined in Russia and Canada which are cold places. The peat moss is extremely porous. Thus, if the peat moss is dried into a moisture content of 2 wt % or below, is becomes a material which can adsorb oil or hydrocarbon as much as 10 to 13 times of its own weight.

In addition, a polyurethane foaming sheet which is used in the process of manufacturing an oil adsorption foaming sheet is foamed as a continuous air bubble non-cellular form, since peat moss containing an excessive amount of water is added in a foaming sheet composite. The density of the polyurethane foaming sheet is in the range of 0.018 to 0.024 g/cc. Since innumerable peat moss particles or parties are combined with and fixed to the texture of the foaming sheet, an oil adsorption function can be enhanced.

Moreover, lecithin that is formed of β-hydroxi ethyltrimethyl ammonium hydroxide (phosphatidyl choline) which is phospholipid, is a cohesive semi-liquid material having a unique perfume and a light brown color, which is melted in water and has an anti-oxidation property as an emulsifying agent, a dispersion agent, a moisturization agent, a lubricant, and a penetrant. The lecithin has heteromorphic and blending properties and also has a function of a surface active agent. The lecithin can be used as foods of animals or nutritive substances of bacillus badge.

The lecithin can secure homogeneity of the polyurethane composite because of emulsification and dispersibility. In addition, since the lecithin has an excellent permeability, it can be deeply penetrated into the polyurethane foaming texture and the peat moss particles. Accordingly, the lecithin enables the polyurethane composite to have a pro-emulsification and a uniform distribution and size of cells.

Any one of a small-scale batch system which is a small-amount production method or a continuous foaming method which is a mass production method may be selectively used as the foaming method. A one-shot method or prepolymer method may be used in the foaming process. In the case of the prepolymer method, a storage stability of prepolymer may be bad, and a more process should be added in order to manufacture prepolymer. However, the present invention employs the prepolymer method in order to secure homogeneity of foaming products and make less occurrence of defective goods. Among a buret divergence style, an alophanate divergence style, and a urethane divergence extension style of the prepolymer method, the present invention adopts the urethane divergence extension style of the prepolymer method.

In addition, an amount of refined cement-phase peat moss that is added to polymer is of a maximum ratio of addition, in order to maximize an oil adsorption. Thus, if an amount of refined cement-phase peat moss is added to polymer in excess of a maximum ratio of addition, a tensile strength of an adsorption sheet is apt to drop and thus the adsorption sheet may be broken. Further, in the case of an excess of a maximum ratio of addition of peat moss, workability on site may fall. Further, since a force of fixing and supporting peat moss particles is weakened, peat moss particles may be easily seceded from texture of the soft polyurethane foaming sheet.

The above-described oil adsorption sheet is used mainly as usage of adsorbing oil or hydrocarbon which is polluted in and floated on seas, lakes, rivers, brooks, etc. A roll of continuous foaming sheet or a number of individual foaming sheets are dispersed and installed on a place such as the seas or waters where oil or hydrocarbon is polluted and floated, in order to adsorb the oil or hydrocarbon. If the adsorbed sheets are collected and then are launched into oil and water simultaneously in a large vessel, oil and water are detached up and down. The adsorption sheets to which oil has been already adsorbed may be re-used on site as being the case. However, if the adsorption sheets are dried, and then dipped into a lecithin solution or a non-ion surface active agent solution to then be launched into water and dried, the adsorption sheets may be re-used two or three times.

If adsorption sheets are buried shallowly or pressed and fixed to a sea water surface layer, in the case of sea which is polluted by oil or hydrocarbon, the polluted oil or hydrocarbon is adsorbed and thus the adsorbed sheets are collected and may be recycled.

Besides, in the case of soil which is polluted by oil or hydrocarbon, concentration of oil having polluted soil, a fertility index (nutrition) of soil, and an acid degree of soil, are measured. Calcium oxide, badge composite etc., are selectively attached on the oil adsorption foaming sheets according to the present invention based on the measured result. Soil is digged from a polluted place and then the soil and oil adsorption foaming sheets are deposited in several layers in a sheet and then soil sequence. Accordingly, soil which has been polluted by oil or hydrocarbon can be recovered by a biological mechanism.

INDUSTRIAL APPLICABILITY

As described above, the present invention provides an oil adsorption foaming sheet using peat moss having an excellent oil adsorption function can adsorb oil or hydrocarbon as much as 10 to 13 times of its own weight, to thereby make it easy to perform an oil pollution preventive work. A secondary pollution which may be caused by scattering or ocean floor deposition of polluted materials, does not occur unlike the conventional oil adsorbent which is formed by fixing a surface active agent to a porous natural mineral or a porous vegetable fiber. In particular, oil or hydrocarbon which pollutes ocean or soil may be adsorbed and recycled, and also oil adsorption foaming sheets may be re-used two or three times, after recycling, to thus provide a more economical efficiency and enhance a more competitiveness.

What is claimed is:

1. A process of manufacturing an oil adsorption foaming sheet, the oil adsorption foaming sheet manufacturing process comprising:

mixing polyurethane prepolymer of 15-17 wt % with peat moss cement of 80-82.8 wt % which is obtained by removing foreign matters from peat moss having a moisture content of 10-50 wt % and making the peat moss pass through a 100-mesh screen, lecithin of 1-2 wt % as a dispersion and surfactant agent, N-methylmorpholine of 1-1.5 wt % as a foaming agent, and triethyleneamine of 0.2-0.3 wt % as a catalyst, to thereby form a foaming composite;

forming the foaming composite to thereby obtain a block-shaped polyurethane foaming body;

slicing the block-shaped polyurethane foaming body to then be made into sheets of a desired thickness; and drying the sliced sheets into a moisture content of 2 wt % or below.

* * * * *